United States Patent

Salemink

[15] 3,661,141
[45] May 9, 1972

[54] HEATING SYSTEM FOR STORAGE TANK

[72] Inventor: Willard L. Salemink, 209 W. Sixth Street, West Liberty, Iowa 52776

[22] Filed: July 10, 1970

[21] Appl. No.: 53,756

[52] U.S. Cl. .................................................126/343.5 A
[51] Int. Cl. ..................................................E01c 19/45
[58] Field of Search ............126/343.5, 343.5 A, 360, 360 A, 126/91 A

[56] References Cited

UNITED STATES PATENTS

| | | | |
|---|---|---|---|
| 2,226,816 | 12/1940 | Hepburn | 126/91 A |
| 2,365,336 | 12/1944 | Dorfan | 126/343.5 A |
| 2,723,659 | 11/1955 | Young et al | 126/360 A |
| 2,820,451 | 1/1958 | Brock et al | 126/343.5 A |
| 3,201,098 | 8/1965 | Muckelrath | 126/91 A X |
| 3,252,655 | 5/1966 | Wollner et al | 126/343.5 A X |
| 3,489,134 | 1/1970 | Cowan | 126/91 A |

*Primary Examiner*—Charles J. Myhre
*Attorney*—Henderson and Strom

[57] ABSTRACT

A system for heating asphaltic cement in a storage tank. The system including a burner, a pipe fluidly connected to the burner and submerged in the cement, a dissipator enclosing the pipe adjacent to the burner to prevent "coking" of the cement disposed adjacent thereto, and a vacuum pump fluidly connected to the pipe for circulating heated gases through the pipe. The dissipator is fluidly connected to the pipe and to the atmosphere such that the vacuum pump also draws atmospheric air into the dissipator to cool the pipe adjacent the burner, which air is heated thereby and drawn through the system to aid in heating the cement. Controls may be provided to automatically activate the burner and pump.

3 Claims, 4 Drawing Figures

*INVENTOR.*
WILLARD L. SALEMINK
BY Henderson & Strom
ATTORNEYS.

HEATING SYSTEM FOR STORAGE TANK

BACKGROUND OF THE INVENTION

This invention relates generally to heating systems and more particularly to heating systems designed to heat asphaltic cement in a storage container.

Asphalt used for general paving purposes includes a mixture of aggregate and sand bound together by asphaltic cement.

In mixing the asphalt, large storage tanks are used to hold an adequate supply of the asphaltic cement. Although these tanks may be insulated, they require heat to keep the cement in a fluid condition for mixing. As a result, the cement must meet rigid temperature specifications and be sufficiently hot to blend properly with the aggregates such as crushed stone and sand.

Heretofore, problems with heating the cement have arisen as a result of its being an inflammable material and its tendency to "coke" or breakdown upon the application of too high of heat.

Many methods have been used to heat asphaltic cement, one such method being to circulate the cement between a storage tank and a heating tank and thereby raise the temperature of the cement in the storage tank. The problem with this method is the necessity of providing a pump and a separate heating tank to accomplish the purpose of the invention.

Another known method includes immersing a plurality of pipes in the cement, each pipe including an electric heating element. The basic problem with this method is the need for a relatively high amount of electricity to activate the elements and accordingly, a higher cost of operation.

Likewise, direct flame heat has been used previously whereby the flame has been blown or drawn through pipes or flues disposed within the tank. This method has been found to be very efficient, however, the problems encountered include uneven heat distribution causing high temperatures in certain areas causing the cement to breakdown or "coke", tank leakage adjacent the flames owing to thermal expansion at the joint of the pipe and tank, and laws of many states prohibiting a direct flame to be applied to single plate when heating inflammable material.

SUMMARY OF THE INVENTION

A system for heating material in a storage tank, the system including a burner, a flue pipe substantially disposed in the tank and submerged in the material, one end of the flue pipe fluidly connected to the burner, a fan connected to the opposite end of the flue pipe and adapted to draw heated gases through the pipe, and a dissipator unit connected to the pipe adjacent the burner and forming a jacket enclosing a space between the pipe and the material, the space fluidly communicating with the interior of the pipe and the atmosphere, whereby the fan draws atmospheric air into the dissipator unit to cool the pipe enclosed therein, the air being heated by the pipe and drawn into the pipe for heating the material.

It is an object of this invention to provide an improved heating system for uniformly heating asphaltic cement in a storage tank.

It is another object of this invention to provide a system for heating asphaltic cement without causing the cement to "-coke."

It is a further object of this invention to provide an efficient "direct" flame system for heating inflammable material that conforms to all state safety laws.

It is yet another object of this invention to provide a novel heat dissipator capable of controlling the inherent extreme heat adjacent to the burner.

It is still another object of this invention to provide a heat dissipator to air cool the flue pipe adjacent to the burner to prevent "coking" of the material being heated, which cool air is heated by the pipe and exhausted from the dissipator into the flue pipe for heating the material distal to the burner.

Yet another object of this invention is to provide a system for heating asphaltic cement that is simple to operate, economical to operate and manufacture, and rugged in construction.

These objects and other features and advantages of this invention will become readily apparent upon reference to the following description, when taken in conjunction with the accompanying drawings.

DESCRIPTION OF THE PREFERRED EMBODIMENT

Figure 1:
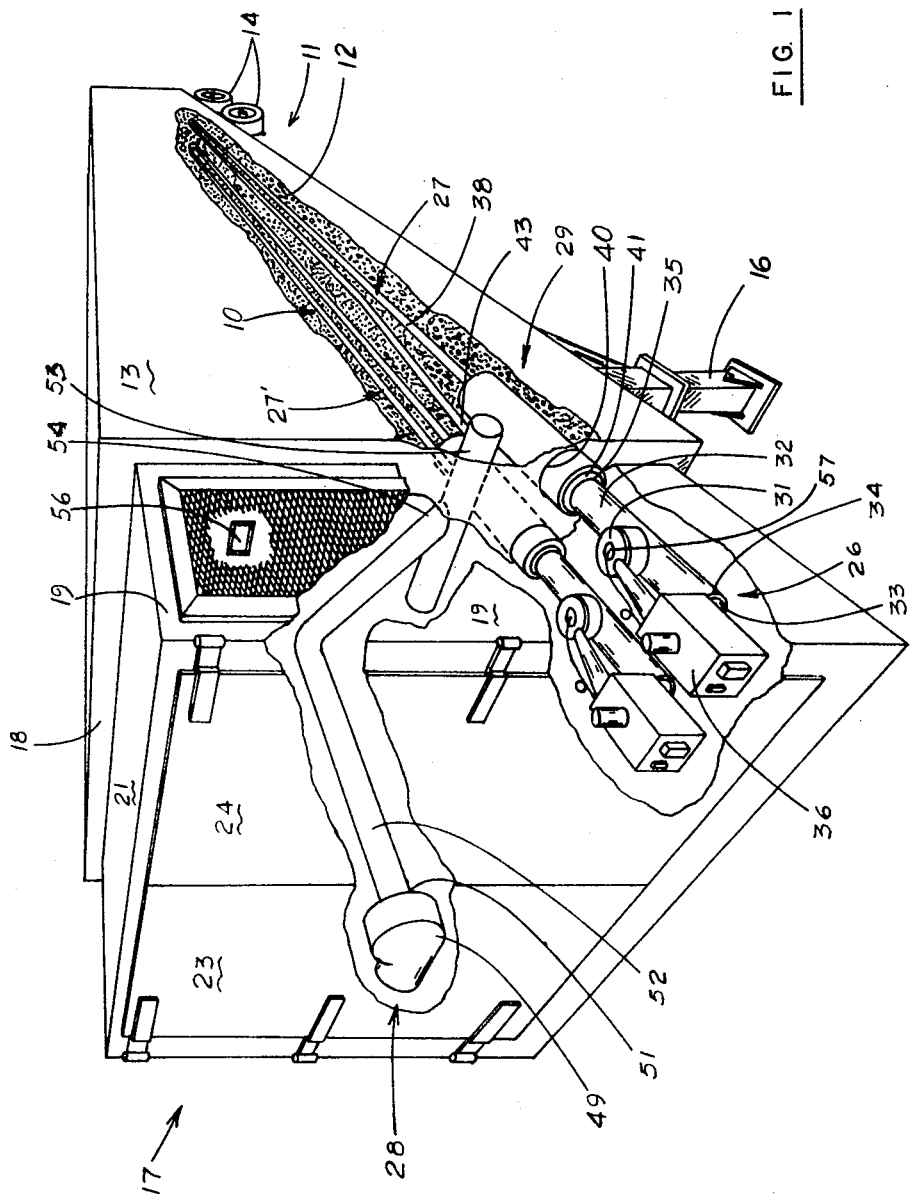
FIG. 1 is a perspective view of an asphaltic cement storage trailer partly broken away to show the heating system of this invention in assembled relation therewith.

Referring now to FIG. 1 of the drawings, the heating system of this invention is indicated generally by numeral 10. The heating system 10 is shown in assembled relation with a trailer 11 adapted for storage of asphaltic cement 12.

The trailer 11 generally resembles a semi-trailer and is adapted to be connected to a conventional truck tractor (not shown) for transporting purposes. The trailer 11 includes a storage tank 13 mounted on a frame (not shown). The trailer 11 is provided with a set of rearwardly mounted tandem wheels 14 and adjustable stanchions 16 for supporting the trailer 11 in a stationary position.

The trailer 11 (FIG. 1) further includes an enclosure 17 disposed forwardly of and connected to the forward wall 18 of the tank 13. The enclosure 17 generally includes a pair of sides 19, only one of which is shown, a top 21 and a bottom (not shown). The enclosure 17 is provided with a pair of door panels 23 and 24 pivotally connected to the sides 19 and forming the front wall of the enclosure 17.

The heating system 10 of the invention is provided to heat the material 12 in the tank 13 and generally includes a burner 26, a flue pipe 27 fluidly connected to the burner 26, a fan unit 28 for drawing heated gases through the flue pipe 27, and a dissipator unit 29 enclosing the flue pipe 27 adjacent to the burner 26.

The burner 26 is a low intensity, infrared generator such as that manufactured by Roberts-Gordon Appliance Corporation of Buffalo, New York. The burner 26 generally comprises a firing device 31 disposed within and connected to a combustion chamber member 32 having an air inlet 33 formed at one end 34 thereof and an air outlet (not shown) disposed as the opposite end 35 thereof. The firing device 31 is fluidly connected to a pressure valve control 36 by tube 37 which valve control 36 is connected to a power source (not shown). The burner 26 is adapted to be powered by natural or LP gas.

The flue pipe 27 (FIGS. 1 and 2) includes a conduit 38 disposed within the tank 13 in an elongated U-configuration extending substantially the length thereof. The conduit 38 includes one end 39 extended through an aperture 40 formed in wall 18 of the tank 13. The extended end 39 of the conduit 38 is fluidly connected to the outlet end 35 of the burner 36 by a threaded sleeve 41, or the like, appropriately fastened to threads 42 provided at the extended end 39 of the conduit 38. The opposite end 43 of the conduit 38 is fluidly connected to the fan unit 28, as hereinafter described. The conduit 38 further includes a plurality of apertures 46,47 and 48 selectively spaced from the wall 18 of the tank 13, for purposes hereinafter described.

The fan unit 28 (FIG. 1) includes a fan 49 disposed exteriorly to the tank 13 and is fluidly connected to one end 51 of outlet pipe 52. The pipe 52 is extended through an aperture (not shown) formed in the wall 18 of the tank 13, and is connected, as be welding, thereto. A manifold 53 is fluidly connected to the opposite end 54 of the outlet pipe 52, and one end 43 of the conduit 38 is fluidly connected to the manifold 53. The manifold 53 is adapted to receive and connect a plurality of flue pipes 27 and 27' to a single vacuum unit 28.

The vacuum unit 28 (FIG. 1) may further include a thermostatic control 56 operably connected to the fan 49. The thermostatic control 56 is connected the wall 18 of the tank 13 and is adapted to automatically activate or deactivate the heating system 10 upon the temperature of the material 12 in the tank 13 attaining a predetermined temperature. The thermostatic control 56 is also adapted to activate an electric pilot ignitor 57, provided with the conventional burner 26, as hereinafter described, be used.

Thus, when the temperature of the material 12 in the tank 13 drops to a predetermined temperature, i.e. 275° F., the thermostatic control 56 initiates operation of the fan 49 and the pilot of the burner 26. The fan 49 begins to draw air through the flue pipe 27 and burner 26. When the air in the burner 26 reaches a negative pressure, the pressure valve control 36 opens to move gas to the firing device 31 for ignition. Air is drawn into the combustion chamber member 32 through inlet 33 for combustion purposes. The thus heated gases of combustion are drawn through the flue pipe 27, which gases transfer their heat to the pipe 27 and material 12.

The heat of combustion raises the temperature of the flue pipe 27 adjacent the burner 26 as high as 1,000° F. In order to prevent "coking" of the asphaltic cement, a dissipator unit 29 is provided.

The dissipator unit 29 can be generally described as a jacket enclosing a space 58 (FIG. 2) formed between the flue pipe 27, the wall 18, and the material 12. More specifically, the dissipator unit 29 includes an elongated jacket member 59 surrounding the flue pipe 27 and spaced therefrom. The member 59 has one end closely connected to the burner 26 (FIG. 1) and the member except a portion near that end extends into the tank 13 through the aperture 40 formed in the wall 18 and the outer wall of the member 59 is sealably connected to the wall 18 around the aperture.

Figure 2:
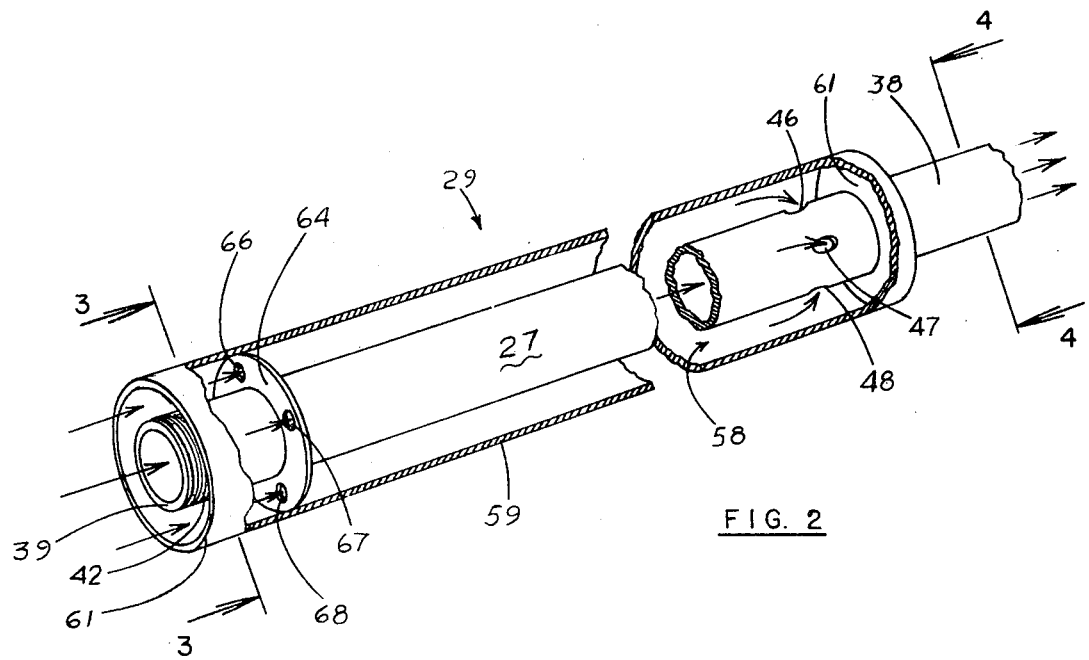
FIG. 2 is a schematic, fragmenting view of the heating system dissipator unit.
Figure 4:
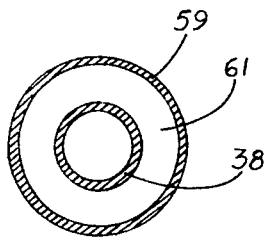
FIG. 4 is a sectional view taken along the line 4—4 of FIG. 2

The jacket member 59 includes a sealing member 61 (FIGS. 2 and 4) interconnecting one end 62 of the member 59 and the conduit 38. The sealing member 61 is connected to the conduit 38 a short distance back of the apertures 46, 47 and 48 formed in the conduit 38, relative to wall 18. Thus, the space 58 between the conduit 38 and material 12 is sealed from the material 12 by the sealing member 61 and jacket member 59, as best illustrated in FIG. 2.

Figure 3:
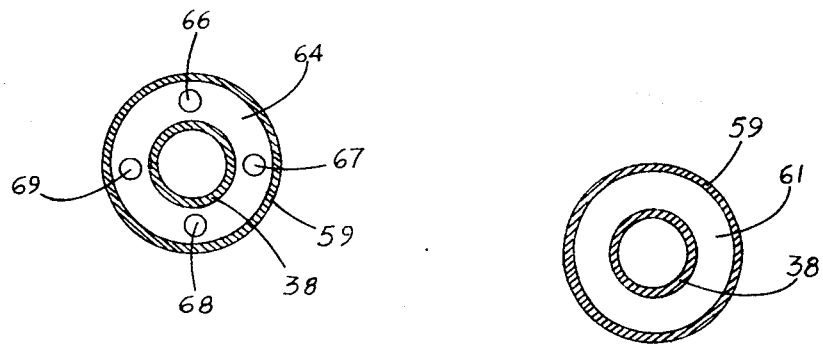
FIG. 3 is a sectional view taken along the line 3—3 of FIG. 2.

The opposite end of the member 59 extends exterior to the tank 13 and includes a closure 64 (FIGS. 2 and 3) having a plurality of apertures 66, 67, 68 and 69 formed therein. The closure 64 interconnects the conduit 38 and member 59 to partially close the jacketed space 58 to the atmosphere.

In operation, the suction created in the flue pipe 27 (FIG. 1) by the pump 49 simultaneously draws the air in the dissipator unit 29 (FIG. 2) into the flue pipe 27 through apertures 46, 47, and 48 (see arrows). The suction thus created in the dissipator unit 29 serves to draw atmospheric air through apertures 66, 67, 68 and 69 of the closure 64 into the dissipator unit 29. The incoming cool air circulates about the flue pipe 27 to cause a heat transfer from the highly heated pipe 27 to the circulating air. The now heated, but circulating air, transfers some of its heat to the jacket member 52 and sealing member 61 to heat the material 12 positional adjacent thereto. The heated air is then drawn into the flue pipe 27 through apertures 46, 47 and 48 and mixes with the heated gases conveyed directly from the burner 26, which mixture than continues through the flue pipe 27 to heat the material 12 disposed adjacent thereto, and is subsequently exhausted to the atmosphere by the fan 49.

A heating system 10 has thus fully described that is capable of efficiently heating asphaltic cement in a storage tank, which system provides against overheating the material and thereby prevents "coking" thereof. The system includes "direct" flame burner to provide efficiency in operation while complying with all safety laws. The dissipator of the system adapted to cool the extremely hot areas of the flue pipe conserves the heat for subsequent heating of the material to provide greater efficiency to the already efficient unit.

While the heating system 10 of this invention has been described for heating asphaltic cement, it should be apparent to those skilled in the art that the system is adaptable for use with other materials.

Although a preferred embodiment of the heating system of this invention has been hereinbefore described, it is to be remembered that various alterations and modifications may be made thereto without departing from the invention as hereinafter defined.

I claim:

1. In a heated storage tank apparatus of the type having a tank and a combustion chamber mounted outside said tank, a flue comprising at least a pipe connected to the outlet of said combustion chamber and positioned in said tank to be in contact with material to be heated therein, and said flue being heated by gas from said combustion chamber;

a jacket as a heat distributor surrounding the portion of said flue that is near the outlet of said combustion chamber and that extends into said tank, one end of said jacket next the outlet of said combustion chamber extending outwardly through the wall of said tank, means for sealing the other end of said jacket to the adjacent outer wall of said flue, said one end of said jacket having an air intake comprising at least an opening for passing a predetermined flow of air to the space between said flue and said jacket, an air exhaust comprising at least an opening near said other end of said jacket through the wall of a portion of said flue enclosed by said jacket for passing said predetermined flow of air, and a fan connected to the end of said flue remote from said jacket to exhaust a mixture of the heated gas supplied by said combustion chamber and said predetermined flow of air from the space between said jacket and said portion of said flue near the outlet of said combustion chamber.

2. A heated storage tank apparatus as claimed in claim 1 wherein said air intake comprises a transverse member extended between the outer wall of said flue and the inner wall of said jacket, and a plurality of apertures through said transverse member spaced to distribute said predetermined flow of air over that portion of said flue enclosed by said jacket.

3. A heated storage tank apparatus as claimed in claim 2 wherein said air exhaust comprises a plurality of spaced openings through the wall of said flue.

* * * * *